UNITED STATES PATENT OFFICE.

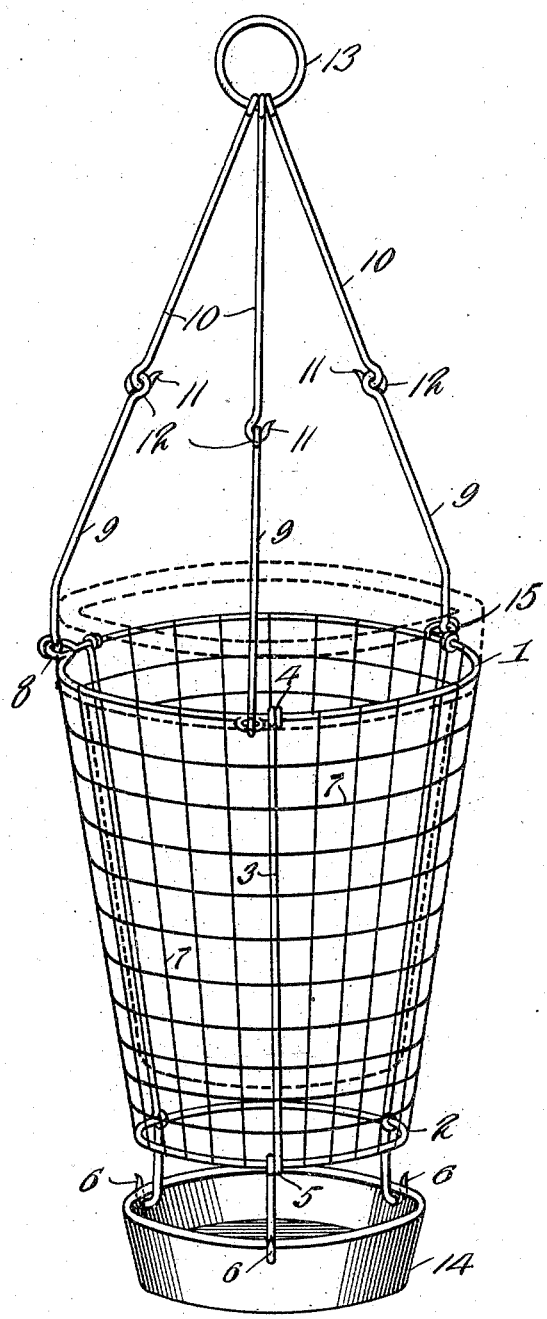

JANE ELLEN GILLESPIE, OF ATLANTA, GEORGIA.

HANGING BASKET.

951,684.

Specification of Letters Patent.    Patented Mar. 8, 1910.

Application filed August 6, 1909.  Serial No. 511,622.

*To all whom it may concern:*

Be it known that I, JANE E. GILLESPIE, a citizen of the United States, residing at Atlanta, in the county of Fulton and State of Georgia, have invented new and useful Improvements in Hanging Baskets, of which the following is a specification.

The invention relates to an improvement in hanging baskets, and is particularly directed to a basket structure designed to receive and support the usual flower pot or similar receptacle to convert the same into an ornamental hanging structure.

The main object of the present invention is the provision of a basket constructed of wire and of a size to receive and support the flower pot or similar receptacle, the basket being provided with means to permit its convenient suspension and with a removable drip pan to prevent damage through leakage from the flower pot.

The invention in the preferred form of details will be described in the following specification, reference being had particularly to the accompanying drawings, in which the figure represents a perspective view of the improved basket, a flower pot being shown therein in dotted lines.

Referring particularly to the accompanying drawings, the improved basket comprises a wire structure made up of an upper ring 1 and a lower ring 2, the latter being of materially less diameter than the former. The rings are connected and maintained in spaced parallel relation by brace rods 3 which at the upper ends are coiled at 4 about the upper ring, and similarly coiled near their lower ends at 5 about the lower ring, the brace rods being extended below the lower ring for a short distance and terminally formed to provide hooks 6, for a purpose which will presently appear. The upper and lower rings are connected by a series of interlaced or crossed wires 7 forming a basket structure of open work effect.

It is to be understood that any or all parts of the structure described may be ornamented or particularly formed as desired, and that such is contemplated as within the present invention.

The upper ring 1 is formed of a series of radial outwardly projecting eyes 8, equally spaced on the ring and serving to loosely receive the lower ends of hanger rods 9 which at their upper ends are connected to additional rods 10 through the medium of hooks 11 formed on the latter removably engaging eyes 12 formed on the upper ends of the rods 9. The upper ends of the rods 10 are loosely connected to a ring 13 adapted to engage any suitable support to provide for the hanging of the basket. A drip pan 14 is removably secured on the hook 6, said pan having a diameter equal to or slightly exceeding that of the lower ring 2 whereby to receive and retain all of the drip from the basket.

The basket proper is designed to receive a flower pot or similar receptacle 15, the upper ring 1 being preferably of such diameter as to engage beneath the upper edge bead on the pot, thereby supporting the latter in a convenient manner within the basket.

The invention provides a simple means for converting the usual plain flower pot into a highly ornamental swinging flower basket, it being understood that the material and size of the basket are not important so far as the present invention is concerned as the use of any desired material and the making of the basket in any desired size are contemplated as within the spirit of the present invention.

What is claimed is:—

1. A basket including an upper ring formed with a series of radial eye members, a lower ring, brace bars connecting the rings, interlaced wires arranged between the rings to form a cylindrical outline, sectional bars connected to one end of the eye members of the upper ring, and a fixture engaging ring connected to the opposing ends of the sectional bars.

2. A hanging basket including an upper ring, a lower ring of less diameter than the upper ring, brace bars connecting the rings and extended below the lower ring, hooks formed on the terminals of the extended portions, a drip pan engaging the hook, interlaced wires connecting the rings and forming a cylindrical outline therebetween, sectional bars movably connected at one end to the upper ring, and a fixture engaging ring connected to the opposing ends of said bar.

In testimony whereof I affix my signature in presence of two witnesses.

JANE ELLEN GILLESPIE.

Witnesses:
  I. W. HARRELL,
  W. E. MANNING.